United States Patent [19]

Recchia et al.

[11] 3,857,890

[45] Dec. 31, 1974

[54] PROCESS FOR PREPARING METHYLENE-DI-ANILINES

[75] Inventors: Francesco P. Recchia, New Haven; Henri Ulrich, North Branford, both of Conn.

[73] Assignee: The Upjohn Company, Kalamazoo, Mich.

[22] Filed: July 25, 1969

[21] Appl. No.: 845,027

[52] U.S. Cl.... 260/570 D, 260/453 AM, 260/465 E
[51] Int. Cl............................................. C07c 85/08
[58] Field of Search.......... 260/570 D, 465 E, 570.9

[56] References Cited
UNITED STATES PATENTS

| | | | |
|---|---|---|---|
| 2,974,168 | 3/1961 | Sharp et al.......................... | 260/570 |
| 3,012,008 | 12/1961 | Lister.................................... | 260/75 |
| 3,097,191 | 7/1963 | France et al....................... | 260/77.5 |
| 3,245,924 | 4/1966 | Cox et al. ..................... | 260/570.9 X |
| 3,297,759 | 1/1967 | Curtiss et al........................ | 260/570 |
| 3,367,969 | 2/1968 | Perkins................................ | 260/570 |
| 3,375,264 | 3/1968 | Sayigh et al. ................... | 260/570 X |
| 3,478,099 | 11/1969 | Ross et al. .......................... | 260/570 |
| 3,496,229 | 2/1970 | Powers et al. ...................... | 260/570 |

FOREIGN PATENTS OR APPLICATIONS 107,718   12/1899   Germany........................... 260/570

OTHER PUBLICATIONS

Houten-Weyl, "Methoden der Organischen Chemie," Vol. 14/2, 4th Ed., pp. 293–295, (1903).

*Primary Examiner*—Robert V. Hines
*Attorney, Agent, or Firm*—Denis A. Firth; John Kekich

[57] ABSTRACT

Di(aminophenyl)methanes having a high proportion of o,p'-isomer (15–25 percent) are obtained by condensing aniline and formaldehyde in the presence of mineral acid, neutralizing the intermediate mixture of aminobenzylamines and, optionally, removing excess aniline and heating the aminobenzylamines in the presence of an aromatic primary amine (e.g., aniline) to produce the corresponding di(aminophenyl)methanes in admixture with polyfunctional polymethylene polyphenyl polyamines. The process has advantages over currently used methods of obtaining such amines in that it is readily adaptable to continuous operation and, in at least the heating step, is free from acid corrosion problems.

11 Claims, No Drawings

PROCESS FOR PREPARING METHYLENE-DI-ANILINES

BACKGROUND OF THE INVENTION

1. Field of the Invention

This invention relates to polyamines and is more particularly concerned with di(aminophenyl)methanes, having substantial o,p'-isomer content and with methylene polyphenyl polyamines containing said diamines and with a novel process for preparation of said polyamines.

2. Description of the Prior Art

The preparation of di(aminophenyl)methane, and mixtures of methylenebridged polyphenyl polyamines containing said diamine, by acid condensation of aniline and formaldehyde, is well-known in the art; see, for example, U.S. Pat. No. 2,683,730. This reaction has become of considerable commercial importance. The diamine itself, and mixtures of polymethylene polyamines containing the diamine as the principal ingredient (which mixtures are the product of the aniline-formaldehyde condensation), are useful as such in the polymer art as curing agents for epoxy resins and for elastomeric polyurethanes. Said diamine and the mixed polyamines containing it are also useful as intermediates in the preparation, by phosgenation, of the corresponding di- and polyisocyanates.

The diisocyanate so obtained is widely used in the preparation of elastomeric polyurethanes while the polymethylene polyphenyl polyisocyanates obtained in the above manner, are widely used in the preparation of polyurethane foams.

The di(aminophenyl)methanes prepared by acid condensation of aniline and formaldehyde in accordance with procedures commonly used hitherto are found to consist mainly (90 percent by weight or greater) of the p,p'-isomer and to contain only minor amounts (less than 10 percent by weight) of the corresponding o,p'-isomer. Said products contain no substantial amounts of the other theoretically possible isomer, namely the o,o'-isomer. It is found that the di(isocyanato-phenyl)methanes prepared from such diamines are solids of low melting point (circa 40°C) and, accordingly, have to be melted and maintained molten in order to be dispensed through conventional mixing machines employed in the commercial preparation of polyurethanes. A number of ways of converting such di(isocyanato-phenyl)methanes to storage stable liquids have been adopted; see, for example, U.S. Pat. No. 3,384,653.

Recently there have been described methods for preparing di(aminophenyl)-methanes which contain substantially higher proportions of o,p'-isomer to p,p'-isomer and it has been found that such mixtures give rise, upon phosgenation, to corresponding mixtures of di(iscyanato-phenyl)methanes which are liquid at ambient temperatures and hence possess marked advantages over the low melting solid di(isocyanato-phenyl)methane hitherto available. Illustratively, U.S. Pat. No. 3,362,979 describes the preparation of a liquid form of di(isocyanato-phenyl)methane containing from 20 to 95 percent by weight of the 2,4'-isomer, the remainder of said mixture being 4,4'-isomer. Said diisocyanate is obtained by phosgenation of the corresponding isomeric mixture of di(aminophenyl)methanes which latter mixture is obtained by condensation of aniline and formaldehyde in the presence of an acidic siliceous catalyst. In the condensation formaldehyde is added to a mixture of aniline and catalyst at a temperature of 100° to 300°C and water is continuously removed from the reaction mixture.

In U.S. Pat. No. 3,277,173 there is described a method of obtaining di-(aminophenyl)methane containing a substantial proportion of the 2,4'-isomer by carrying out the Lewis acid catalyzed reaction of aniline and formaldehyde in the presence of a carefully controlled amount of water (including the water of condensation).

Belgian Pat. No. 648,787 described the preparation of di(aminophenyl)methane containing substantial proportions of o,o'-isomer and o,p'-isomer in addition to p,p'-isomer by employing high final reaction temperatures in the hydrochloric acid-catalyzed condensation of aniline and formaldehyde.

We have now found that di(aminophenyl)methanes in which the proportion of o,p'-isomer is substantial, i.e., is of the order of about 15 to about 25 percent of the total di(aminophenyl)methane, can be prepared using a novel procedure which is possessed of marked economic advantages.

SUMMARY OF THE INVENTION

This invention comprises a process for the preparation of a mixture of methylene-bridged polyphenyl polyamines wherein the major component is a di(aminophenyl)methane wherein the proportion of o,p'-isomer to p,p'-isomer in the latter substantial, said process comprising:

heating at a temperature of about 150° to about 300°C a mixture of (i) an aromatic primary amine and (ii) an acid-free mixture of aminobenzylamines obtained by condensing aniline with formaldehyde in the presence of mineral acid and neutralizing the reaction product.

The invention also comprises the di(aminophenyl)methanes having substantial o,p'-isomer content so produced, either as part of a mixture of methylenebridged polyphenyl polyamines or in purefied form. The invention also comprises the corresponding di(isocyanatophenyl)methanes and the polymethylene polyphenyl polyisocyanates derived by phosgenation of the di(aminophenyl)methanes and methylene-bridged polyphenyl polyamines obtained as described above.

DETAILED DESCRIPTION OF THE INVENTION

The reaction between aniline and formaldehyde in the presence of a mineral acid such as hydrochloric acid has been the subject of considerable study over a prolonged period. It is generally recognized that the reaction occurs in two distinct stages — the second of which is generally conducted at relatively higher temperatures than the first. The various stages in the reaction so far as it relates to the preparation of the major product, namely di(aminophenyl)-methane, can be represented schematically as follows:

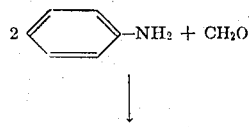

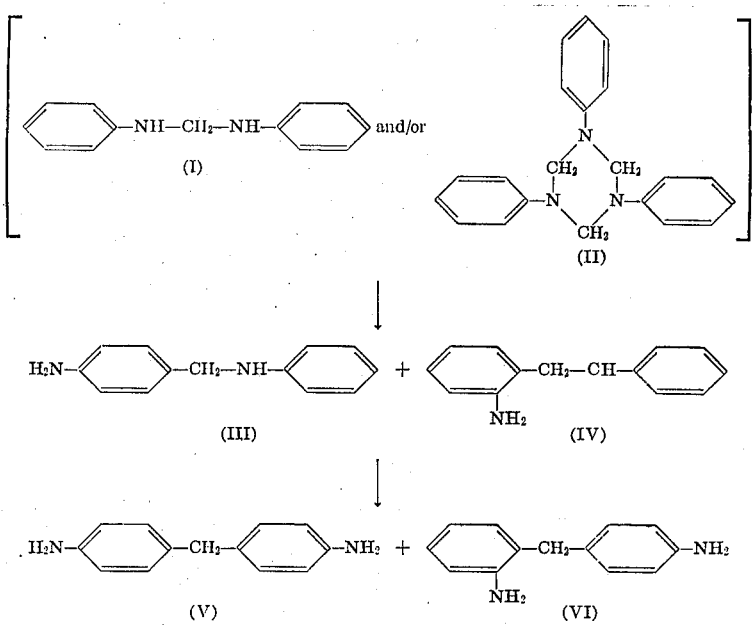

In the above condensation the aniline and formaldehyde react to form, as a highly transient intermediate, methylene dianiline (I). It is believed that the symmetrical N,N',N''-triphenylhexahydrotriazine (II) is also formed at this stage and that its subsequent behavior parallels the behavior of (I). The transient intermediates (I) and (II) then rearrange to form N-phenylaminobenzylamines. At least two such monomeric products are possible, namely, the p-isomer represented by the formula (III) and the corresponding o-isomer represented by the formula (IV). The principal isomer formed is normally the p-isomer (III) with the o-isomer as the minor component. As will be readily appreciated by one skilled in the art, the formation of the monomeric products (III) and (IV) is accompanied by formation of corresponding oligomeric products which can be represented by the generic formula

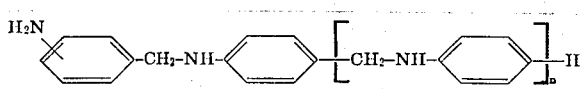

wherein the free amino group is o- or p- with respect to the —CH$_2$—NH— bridging group, the multiple —CH$_2$—NH— groups are o- or p- with respect to their immediate neighbors and n is whole number. The mixture of isomers (III) and (IV), and the oligomeric forms thereof, is hereinafter referred to as the "aminobenzylamines."

In the final sequence of the above reaction, the aminobenzylamines (III) and (IV) rearrange to form the corresponding di(aminophenyl)methanes including the p,p'-isomer (V) and the o,p'-isomer (VI). It will be seen that rearrangement of the aminobenzylamines (III) and (IV) can also give rise to the o,o'-isomer of di(aminophenyl)methane although, in the interests of simplicity, this particular isomer is not shown in the reaction scheme since it is generally not formed in any substantial amounts. It will be appreciated by one skilled in the art that the oligomeric forms of the aminobenzylamines (III) and (IV), discussed above, will rearrange to give corresponding polymethylene polyphenyl polyamines but the formation of such products has not been shown in the above reaction scheme in the interests of simplicity.

Of the various stages shown in the above reaction, the first two, namely the formation of the transient intermediates (I) and (II) and their rearrangement to the corresponding aminobenzylamines (III) and (IV), generally occur when the aniline and formaldehyde are brought together in the presence of mineral acid at ambient temperatures, i.e., of the order of about 25°C without the application of external heat. The reaction is exothermic and, unless controlled by cooling, the temperature of the reaction mixture will rise substantially.

The final stage of the above process, i.e., the rearrangement of the aminobenzylamines, will not take place to any significant degree until the reaction mixture is heated, generally to a temperature in excess of about 90°C.

We have now found, in one aspect of the present invention, that considerable and unexpected advantages accrue when the above reaction sequence is interrupted at the stage at which the intermediate aminobenzylamines have been formed and the acid which was employed as catalyst in this initial stage of the reaction sequence is neutralized prior to carrying out the second stage of the reaction. Thus, we have found not only that the proportion of o,p'-isomer (VI) to p,p'-isomer (V) obtained in the second stage is altered to a substantial extent in favor of the formation of increased o,p'-isomer content, but the ease of processability and the lack of corrosiveness of the acid-free reaction mixture render the overall procedure much more attractive economically.

In a further aspect of the present invention we have found that the neutralized aminobenzylamines can be reacted, preferably after the removal of any excess aniline, with an aromatic primary amine other than aniline whereby there are produced "mixed" di(aminophenyl)amines and mixed higher functional polymethylene polyphenyl polymines, i.e., products in which the substituents within the various phenyl residues differ in nature. We believe that the reaction taking place in this aspect of the invention involves a displacement-type reaction between the aminobenzylamine and aromatic primary amine. For example, in the case of the reaction between the component (III) of the aminobenzylamine mixture and an aromatic primary amine such as o- toludine, we believe that the first stage in the reaction probably involves the following displacement:

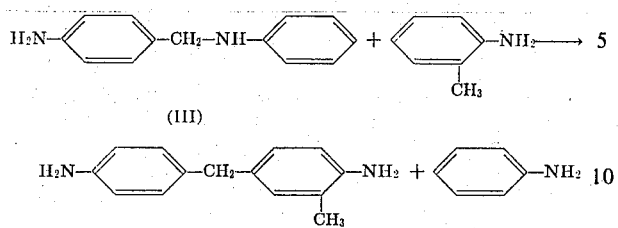

The aniline liberated by this reaction is then available for further reaction, in competition with the previously added aromatic amine, with the aminobenzylamines. The extent to which these additional reactions occur will obviously depend upon a number of factors, the principal ones being the proportion of added aromatic primary amine and the relative rates at which the latter and the liberated aniline will take part in the postulated reaction. The above reaction mechanism has been discussed in terms of the fate of a single component of the mixture of aminobenzylamines. Similar reactions will occur involving the other components of said mixture.

It is to be understood that the above discussion of probable reaction mechanisms is offered by way of explanation only and is not to be construed as in any way limiting the scope of this aspect of the invention.

The aromatic primary amines which are employed in this aspect of the invention include any aromatic primary amine which is free of substituents in at least one of the nuclear positions ortho and para to the amino group and which carries from 1 to 4 inert substituents in the aromatic nucleus. By "inert substituents" are ment substituents which do not interfere in any significant manner with the desired course of the process of the invention.

Examples of inert substituents are halo, i.e., chloro, fluoro, bromo, and iodo; nitro; cyano; lower-alkoxy such as methoxy, ethoxy, propoxy, butoxy, pentyloxy, hexyloxy, heptyloxy, octyloxy, and isomeric forms thereof; lower-alkyl such as methyl, ethyl, propyl, butyl, pentyl, hexyl, heptyl, octyl, and isomeric forms thereof; and the like.

Illustrative aromatic amines which are employed in the process of the invention are substituted anilines such as 2-chloroaniline, 2-bromoaniline, 2,6-dibromoaniline, 4-fluoroaniline, 4-iodoaniline, o-anisidine, p-anisidine, o-ethoxyaniline, m-isopropoxyaniline, p-octyloxyaniline, o-toluidine, p-toluidine, m-toluidine, o-xylidine, m-xylidine, 3-propylaniline, 4-hexylaniline, 4-isooctylaniline, 2-nitroaniline, 4-cyanoaniline, and the like; aromatic diamines such as o-phenylenediamine, m-phenylenediamine, p-phenylenediamine, 2-chlorophenylene-1,3-diamine, 4-bromophenylene-1,3-diamine, 2-methoxyphenylene-1,4-diamine, 3-ethoxyphenylene-1,2-diamine, 4-hexyloxyphenylene-1,2-diamine, toluene-2,4-diamine, toluene-2,6-diamine, 1,2-xylene-4,5-diamine, 2-ethylphenylene-1,4-diamine, 2-hexylphenylene-1,4-diamine, di(4-aminophenyl)-methane, 4,4'-diaminodiphenyl and the like.

The mixed di(aminophenyl)methanes and mixed polymethylene polyphenyl polyamines which are produced in accordance with the above aspect of the process of the invention are novel compositions which are characterized [like the "unmixed" di(aminophenyl)methanes and higher polyamine mixtures prepared in accordance with the invention] by relatively high proportions of o,p'-isomer to p,p'-isomer. Similarly, the diisocyanates and polyisocyanates produced therefrom by phosgenation are characterized by the same proportion of isomers as the starting amines from which they are prepared. The diiocyanates are in many cases liquids which show no tendency to crystallize or deposit solid on standing. The reactivity of the isocyanate group in one phenyl nucleus of the mixed diisocyanates and polyisocyanates differs, in many cases, from that of the isocyanate group in the other phenyl nucleus. This finding can be used to advantage in cases where it is desired to prepare polyurethanes by a controlled two-step reaction. Using isocyanates of the above nature means that the reaction generally proceeds at an easily-controlled rate and greater regularity in the polymer structure is obtained resulting in enhanced physical properties.

A particularly useful mixed polymethylene polyphenyl polyamine mixture is that prepared in accordance with the above aspect of the process of the invention using, as the aromatic primary amine other than aniline, 2,4-diaminotoluene, 2,6-diaminotoluene or mixtures thereof. The polyamine mixtures so obtained contain as the major component one of the triamines:

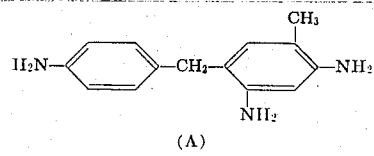

(A)

or

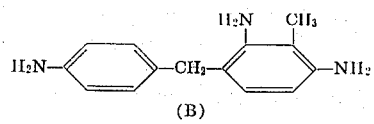

(B)

The triamine (A) is that derived using 2,4-diaminotoluene and triamine (B) is that obtained using 2,6-diaminotoluene. The triamines also contain significant proportions of the isomers of (A) or (B) in which the NH₂ in the otherwise unsubstituted phenyl ring is in the o-position. The triamines can be isolated from the mixtures obtained as described above by distillation. The above triamines and polyphenyl polyamine mixtures containing them are novel and highly useful as epoxy curing agents and the like because of their high functionality. In addition said triamines and the polyamine mixtures containing them can be phosgenated, by well-known procedures, to give the corresponding polyisocyanates which are highly useful, particularly in view of their high functionality, as intermediates in the preparation of both cellular and non-cellular polyurethanes in accordance with procedures well-known in the art.

In carrying out the process of the invention, the formation of the intermediate aminobenzylamines is carried out in accordance with any of the procedures hitherto employed in the art to achieve this first stage of the reaction. Advantageously the aniline and formaldehyde are brought together under aqueous conditions in the presence of the mineral acid and using appropriate agitation means. The order which the reactants are brought together is not critical although it is found advantageous to add the aniline to a preformed mixture of formaldehyde and acid, rather than vice versa.

The reaction between the aniline and formaldehyde is exothermic and, if desired, the reaction mixture can be cooled in order to keep the reaction temperature from rising beyond any desired level. The reaction temperature can also be controlled by the rate at which the reactants are brought together. Advantageously the reaction of the aniline and formaldehyde is allowed to take place at a temperature within the range of about 0° to 100°C. Preferably the reaction temperature is maintained within the range of about 0°C to about 50°C. The reaction temperature can be maintained at a specific temperature within this range or can be allowed to rise or fall at will, by adjusting rates of addition of reactants or like means, provided the reaction temperature does not pass outside the above limits. It is found that the higher temperatures in the above range can be tolerated more readily as the amount of mineral acid present in the reaction mixture is reduced.

The proportions in which the aniline, formaldehyde, and acid are brought together are determinative of the overall yield of diamine and, to a certain extent, of the proportion of o,p'-isomer to p,p'-isomer, in the final product. Advantageously, the proportion of aniline to formaldehyde is at least 2 moles of the former for each mole of the latter employed in the process of the invention. While the lower limit of concentration of aniline to formaldehyde is critical in terms of the overall result achieved in the process, the upper limit of proportions is free from such criticality and is dictated largely by economic considerations. As will be discussed hereafter, when aniline rather than a different aromatic amine is used in the final step, an excess of aniline (over the minimum proportion specified above) can serve as the aniline employed in the second stage of the process of the invention. Accordingly, when aniline is used in the final stage, the choice of proportion of aniline employed in the first stage of the process of the invention can be dictated by the overall requirements of the process rather than being confined solely to a consideration of the proportion necessary in the first stage alone.

The amount of acid employed in the first stage of the process of the invention can vary over wide limits and is advantageously within the range of about 0.01 mole to about 0.85 moles per mole of aniline. Preferably the amount of acid employed is within the range of about 0.03 mole to abut 0.20 mole per mole of aniline. It is to be noted that the lower limit of proportion of acid employed as catalyst in this condensation is markedly lower than anything hitherto described and encountered in the art. The finding that one can operate successfully with so low a concentration of acid is indeed novel and surprising and represents a further aspect of the present invention.

Any of the acid catalysts hitherto employed in the art, including those specifically disclosed in the prior art cited above, can be used as catalyst in the first stage of the process of this invention. Advantageously, the acid employed as catalyst is a mineral acid and preferably the catalyst is hydrochloric acid.

The progress of the condensation of the aniline and formaldehyde in the above first stage reaction can be followed readily by conventional analytical techniques such as infrared spectroscopy, NMR spectroscopy and the like; formation of the aminobenzylamines (III) and (IV) is detected and followed by any such techniques. When the condensation is adjudged to be completed the reaction mixture is treated to neutralize the acid catalyst. The neutralization can be effected by any conventional procedure. Advantageously the neutralization is accomplished by washing the reaction mixture one or more times with an aqueous solution of an alkali metal hydroxide such as sodium hydroxide, potassium hydroxide, lithium hydroxide and the like, or with an aqueous solution of an alkali metal or alkaline earth metal carbonate or bicarbonate, such as sodium carbonate, potassium carbonate, sodium bicarbonate, calcium carbonate and the like.

The washing of the reaction mixture with the alkaline solution can be effected by any conventional means of bringing the two components together, e.g., by mixing, agitating or, on the large scale, by passing the two components countercurrently in a tower or other suitable vessel. When the neutralization has been effected, the aminobenzylamines layer is separated from the aqueous layer by decantation, siphoning, distillation and the like. If desired, the aminobenzylamine layer is washed with water to remove any excess alkaline material or other inorganic matter prior to being subjected to the final stage of the process of the invention. If aniline is the aromatic amine to be employed in the next stage of the process, it is generally unnecessary to remove excess aniline from the aminobenzylamine mixture. When an aromatic amine other than aniline is to be used in the next stage the excess aniline is removed from the aminobenzylamine mixture by conventional methods such as by steam distillation of the neutralized aminobenzylamine mixture.

Advantageously, but not essentially, the aminobenzylamine layer is dried either by distillation of water or by treatment with anhydrous sodium sulfate, barium oxide, sodium carbonate and the like before being subjected to said final stage.

In the final stage of the process of the invention, the aminobenzylamines are exposed, in admixture with an aromatic primary amine, to a temperature within the range of about 150°C to about 300°C. When the aromatic amine is aniline the amount of free aniline present in admixture with the aminobenzylamines at the beginning of this phase of the process of the invention is at least about 0.5 mole per mole of aminobenzylamines and is preferably at least about 3 to 4 moles per mole of aminobenzylamines. The upper limit of proportion of free aniline present in the reaction mixture is not critical and is governed purely by economic factors. Proportions as high as 20 moles of aniline per mole of aminobenzylamines or even higher can be employed without influencing the course of the reaction or giving advantages other than those gained by using the minimum proportion of aniline set forth above.

Depending on the amount of excess aniline employed in the first stage of the process of the invention, it may or may not be necessary to add further aniline to the reaction mixture prior to the final step of the process of the invention. Thus, by employing a sufficient excess of aniline in the first stage of the reaction, it is possible to produce a mixture of aminobenzylamines and aniline in which the proportion of the latter is in excess of the minimum required for carrying out the final stage of the process of the invention. Alternatively, when the proportion of aniline employed in the first stage of the process of the invention has been held to the minimum required to carry out that step, it will be necessary to add additional aniline prior to the final step in order to bring up the proportion of aniline necessary for that step.

When the aromatic primary amine employed in this final stage of the process of the invention is other than aniline, the minimum molar proportion of such amine employed in the reaction is of the same order as the minimum proportions of aniline set forth above. However the upper limit of amount of such primary amine is somewhat more critical than that for aniline not so much in terms of overall yield of diamine but in terms of proportion of mixed polyamines formed in the process. Thus, in general, the higher proportion of aromatic primary amine employed in this step of the process the greater the proportion of mixed polyamine in the final product. Accordingly the choice of proportion of primary aromatic amine employed in any given case will depend upon the proportion of mixed polyamine it is desired to obtain in the end product.

The time for which the mixture of aromatic primary amine and aminobenzylamines is heated in the final step is a function of the reaction conditions, particularly reaction temperature, employed in any given case. The progress of the reaction can be followed by routine analytical procedures such as infrared spectroscopy, gas liquid phase chromatography and the like. When the reaction is adjudged to be complete by any of these analytical procedures, the reaction mixture is treated in any appropriate manner depending upon the ultimate intended use of the mixture of polyamines obtained. For example, the reaction mixture can be distilled to remove excess aromatic primary amine and the mixture of polymethylene polyphenyl polyamines so obtained is recovered as such. Alternatively, the latter mixture can be further distilled or subjected to separation by other means such as chromatography, fractional crystallization and the like, to recover in part, or in whole, the mixed or unmixed di(aminophenyl)methanes present in the reaction mixture.

The mixture of polymethylene polyphenyl polyamines obtained directly from the above reaction, or the mixture of polymethylene polyphenyl polyamines remaining after partial or complete removal of the di(aminophenyl)methane content thereof can be employed for any of the purposes for which such mixtures are employed in the art. For example, the mixture of polyamines can be employed as curing agent for epoxy resins or can be employed as intermediates in the preparation, by phosgenation, of the corresponding polymethylene polyphenyl polyisocyanates. The latter are commonly employed in the preparation of polyurethane foams.

The di(aminophenyl)methanes, which can be isolated as described above, can also be used for any of the purposes for which such mixtures are conventionally employed in the art. For example, they can be used as curing agents for epoxy resins or as intermediates in the preparation, by phosgenation, of the corresponding di(isocyanatophenyl)methanes. The latter isocyanates, because of the presence of the substantial proportion of the o,p'-isomer therein, have the advantage of being stable liquid products at all normal working temperatures (15° to 25°C). This is in direct contrast to the di(isocyanatophenyl)-methanes containing 90 percent or higher of p,p'-isomer which are generally solids at normal room temperatures (circa 20° to 25°C) and which consequently require melting in order to be metered and dispensed using conventional equipment in the preparation of polyurethanes.

As previously mentioned the di(aminophenyl)methanes obtained in accordance with the process of the invention, whether in the form of the isolated diamine or of the mixture of methylene-bridged polyphenyl polyamines, contain a substantial proportion of the o,p'-isomer and a small proportion of the o,o'-isomer in addition to the p,p'-isomer which is the main component. The relative proportion of the two main isomers, o,p'-isomer and p,p'-isomer, in the diamine is substantially independent of the precise conditions or proportions of reactants employed in the process of the invention. Thus the proportion of o,p'-isomer to p,p'-isomer in the diamine produced in accordance with the invention is generally within the range of about 20:80 to about 30:70.

The process of the invention can be carried out in a batch-type process or can be carried out either partly or wholly in a continuous manner. For example, the first step in the reaction process, the condensation of aniline and formaldehyde, can be carried out in a single batch or in a continuous process in which the reactants are fed continuously in the appropriate proportions to one end of a reaction zone and the mixture of aminobenzylamines is withdrawn continuously from the other end thereof. The resulting mixture can be neutralized in a batch procedure or on a continuous basis as by passing the aminobenzylamines countercurrently to aqueous alkaline solution in a tower or like vessel. The neutralized aminobenzylamines after addition of further aniline if required, or removal of aniline and addition of an aromatic primary amine other than aniline, can then be passed continuously through a reaction zone maintained at a temperature within the range required to accomplish the final stage of the process. The desired final product is continuously withdrawn from the other end of the reaction zone. The rate of passage is adjusted so that the residence time of the mixture is appropriate to achieve conversion of the aminobenzylamines to the desired mixture of methylene-bridged polyphenyl polyamines.

In addition to providing di(aminophenyl)methanes having a highly useful isomer proportion therein, as discussed above, the process of the invention has the advantage that the final step of the process is carried out under non-acidic conditions. Hence the highly corrosive reaction conditions encountered in the prior art procedures are avoided using the process of the invention. The advantages flowing from this will be readily apparent to those skilled in the art. In addition the use of the novel, very low acid concentration in the first step, i.e., the formation of aminobenzylamines, presents an additional advantage in terms of overall lack of corrosiveness in the handling of the reaction mixture.

The following example describe the manner and process of making and using the invention and set forth the best mode contemplated by the inventors of carrying out the invention but are not to be construed as limiting.

EXAMPLE 1

A mixture of 8.14 g. (0.1 mole) of 36.9 percent w/w aqueous formaldehyde and 39.44 g. (0.4 mole) of 37 percent w/w aqueous hydrochloric acid solution was added dropwise with stirring to 74.46 g. (0.8 mole) of aniline maintained at 0° to 2°C. The total time taken for the addition was 1 hour. When the addition was complete the mixture was maintained at circa 0°C for an additional 3 hours. At the end of this time a total of 50 ml. of 50 percent w/w aqueous sodium hydroxide solution was added over a period of 30 minutes. The resulting mixture was found to be basic to litmus. After dilution with water (150 ml.) the mixture was allowed to warm to room temperature (circa 25°C). The resulting mixture was extracted with ether (50 ml.) and the organic layer was separated and washed with water until the washings were neutral to litmus. The organic layer was then dried over anhydrous sodium sulfate, the dried solution was filtered and the filtrate was evaporated under reduced pressure to remove the ether. There was thus obtained 57 g. of an aniline solution of a mixture of aminobenzylamines.

An aliquot (12 g.) of the above aniline-aminobenzylamine mixture was heated in an oil bath at 193°C for 1 hour. The resulting mixture was immediately cooled to room temperature. A nuclear magnetic resonance spectral analysis of a portion of the product showed the absence of resonance corresponding to a benzylamine methylene proton and the presence of resonance corresponding to a diphenylmethane methylene proton. The entire reaction product was steam distilled to remove aniline and the undistilled residue was extracted with ether. The ether extract was dried over anhydrous sodium sulfate and the dried extract was evaporated to dryness. There was thus obtained 2.3 g. (73 percent theoretical yield overall based on formaldehyde) of a mixture of polyamines. The mixture was found by gel permeation chromatography (G.P.C) to contain 80 percent by weight of di(aminophenyl)methane and by gas liquid phase chromatography (G.L.P.C.) (using internal standards based on synthetic mixtures of pure materials) the di(aminophenyl)methane was found to contain 75.1 percent by weight of the 4,4'-isomer, 22.3 percent by weight of 2,4'-isomer and 2.6 percent by weight of 2,2'-isomer.

EXAMPLE 2

A mixture of 8.14 g. (0.1 mole) of 36.9 percent w/w aqueous formaldehyde and 19.72 g. (0.2 mole) of 37 percent w/w aqueous hydrochloric acid solution was added dropwise with stirring to 37.23 g. (0.4 mole) of aniline maintained at 0° to 2°C. The total time taken for the addition was 1 hour. When the addition was complete the mixture was maintained at circa 0°C for an additional 3 hours. At the end of this time a total of 50 ml. of 50 percent w/w aqueous sodium hydroxide solution was added over a period of 30 minutes. The resulting mixture was found to be basic to litmus. After dilution with water (150 ml.) the mixture was allowed to warm to room temperature (circa 25°C). The resulting mixture was extracted with ether (50 ml.) and the organic layer was separated and washed with water until the washings were neutral to litmus. The organic layer was then dried over anhydrous sodiium sulfate, the dried solution was filtered, and the filtrate was evaporated under reduced pressure to remove the ether. There was thus obtained 28 g. of an aniline solution of a mixture of aminobenzylamines.

An aliquot (14.09 g.) of the above aniline-aminobenzylamine mixture was heated in an oil bath at 197°C for 1 hour at the end of which time the reaction mixture was immediately cooled to circa 25°C. Nuclear magnetic resonance spectral analysis indicated absence of benzylamine methylene proton resonance and presence of diphenylmethane methylene proton resonance. The entire reaction mixture was steam distilled to remove excess aniline and the undistilled residue was extracted with chloroform. The chloroform solution was dried over anhydrous sodium sulfate and the dried solution was evaporated to dryness under reduced pressure. There was thus obtained 7.2 g. (91 percent theoretical overall yield based on formaldehyde) of a mixture of polyamines. The mixture was found by G.P.C. to contain 60 percent by weight of di(aminophenyl)methane and, G.L.P.C., the di(aminophenyl)methane was found to contain 80 percent by weight of 4,4'-isomer, 20 percent by weight of 2,4'-isomer and only a trace of 2,2'-isomer.

EXAMPLE 3

A mixture of 8.14 g. (0.1 mole) of 36.9 percent w/w aqueous formaldehyde and 29.58 g. (0.3 mole) of 37 percent w/w aqueous hydrochloric acid solution was added dropwise with stirring to 55.88 g. (0.6 mole) of aniline maintained to 0° to 2°C. The total time taken for the addition was 1 hour. When the addition was complete the mixture was maintained at circa 0°C for an additional 3 hours. At the end of this time a total of 50 ml. of 50 percent w/w aqueous sodium hydroxide solution was added over a period of 30 minutes. The resuling mixture was found to be basic to litmus. After dilution with water (150 ml.) the mixture was allowed to warm to room temperature (circa 75°C). The resulting mixture was extracted with ether (50 ml.) and the organic layer was separated and washed with water until the washings were neutral to litmus. The organic layer was then dried over anhydrous sodium sulfate, the dried solution was filtered, and the filtrate was evaporated under reduced pressure to remove the ether. There was thus obtained 45 g. of an aniline solution of a mixture of aminobenzylamines.

An aliquot (12.0 g.) of the above aniline-aminobenzylamines mixture was heated in an oil bath at 193°C for 1 hour. At the end of this time the reaction mixture was immediately cooled to circa 25°C and found by nuclear magnetic resonance spectral analysis to be free from starting aminobenzylamines. The entire reaction mixture was steam distilled to remove excess aniline and the undistilled residue was extracted with ether. The ether extract was dried over anhydrous sodium sulfate and the dried solution was evaporated to dryness. There was thus obtained 3.2 g. (77 percent theoretical overall yield based on formaldehyde) of a mixture of polyamines. The mixture was found by G.P.C. to contain 70 percent by weight of di(aminophenyl)methane and, by G.L.P.C., the di(aminophenyl)methane was found to contain 76.6 percent by weight of 4,4'-isomer, 21.1 percent by weight of 2,4'-isomer, and 2.3 percent by weight of 2,2'-isomer.

EXAMPLE 4

A total of 81.6.g. (1 mole) of 36.8 percent w/w aqueous formaldehyde solution was added with stirring to 558.8 g. (6 mole) of aniline over a period of 10 minutes at room temperature (circa 25°C). At the end of this time 17.7 g. (0.18 mole) of 37 percent w/w aqueous hydrochloric acid was added slowly with stirring. The resulting mixture was then stirred at room temperature for a further 3 hours. The reaction mixture was then cooled to 10°C and rendered basic to litmus by the slow addition of 20 g. (0.25 mole) of 50 percent w/w aqueous sodium hydroxide solution. The basified mixture was diluted with water and extracted with benzene. The benzene extracted was washed with water until the washings were neutral to litmus, and was dried over anhydrous magnesium sulfate. The dried extract was evaporated to dryness under reduced pressure to yield 547.5 g. of an aniline solution of aminobenzylamines.

An aliquot (30.5 g.) of the above material was heated to 190°C and maintained at that temperature until NMR spectral analysis of a test portion indicated that conversion to polyphenyl polyamines was complete. The resulting product was heated under pressure to remove traces of aniline and the residue was found by G.P.C. to contain 63 percent by weight of di(aminophenyl)methane. By G.L.P.C. the di(aminophenyl)methane was found to contain 74.6 percent by weight of the 4,4'-isomer, 23.3 percent by weight of the 2,4'-isomer, and 2.1 percent by weight of the 2,2'-isomer.

EXAMPLE 5

A total of 81.6 g. (1 mole) of 36.8 percent by weight aqueous formaldehyde solution was added dropwise to 558.75 g. (6 mole) of aniline over a period of 10 minutes and maintaining the temperature of the mixture at about 25°C. When the addition was complete the mixture was stirred for 1 hour at about 25°C before adding 17.7 g. (0.18 mole) of 37 percent by weight aqueous hydrochloric acid over a period of 10 minutes. The temperature of the mixture was maintained at approximately 25°C during the addition. When the addition was complete the resulting mixture was stirred for 3 hr. at circa 25°C before being cooled to 0°C to −10°C. To the cold mixture was added, with additional cooling, 20 g. (0.25 mole) of 50 percent by weight aqueous sodium hydroxide. The mixture was stirred for 30 minutes after the addition was complete and then was subjected to steam distillation to remove excess aniline. After the steam distillation was complete the residue was extracted with benzene, the benzene extract was washed with water until the washings were neutral to litmus and then dried over anhydrous magnesium sulfate. The dried extract was filtered and the filtrate was evaporated under reduced pressure to remove the benzene. The residual benzylamine mixture had a weight of 165.3 g.

A mixture of 5.04 g. (0.03 mole) of the above benzylamine mixture and 13.07 g. (0.122 mole) of o-toluidine was heated at 197° to 215°C for a period of 22.75 hr. G.P.C. analysis of the reaction product showed a total content of diamine 70 percent by weight. G.L.P.C. analysis showed that approximately 90 percent of the diamine was (aminophenyl)-(aminotolyl)methane. Of the (aminophenyl)-(aminotolyl)methane about 90 percent by weight was 3-methyl-4,4'-diaminodiphenylmethane and about 10 percent by weight was 3-methyl-2,4'-diaminodiplenylmethane.

The mixture of methylene-bridged polyphenyl polyamines prepared as described above is phosgenated as follows:

The polyamine mixture is dissolved in chlorobenzene (100 ml.) and added slowly, with stirring and cooling at 0°C, to a saturated solution of phosgene in 200 ml. of chlorobenzene. The resulting mixture is stirred and heated slowly to 75°C. Phosgene is passed into the resulting slurry in a steady stream and the temperature of the mixture slowly raised to circa 120°C and maintained thereat with stirring until a clear solution is obtained and evolution of hydrogen chloride ceases. The resulting solution is purged with nitrogen to remove excess phosgene and the chlorobenzene solvent is removed by distillation under reduced pressure. There is thus obtained a mixture of polymethylene polyphenyl polyisocyanates containing about 70 percent methylenebis(phenylisocyanates). Approximately 81 percent of said diisocyanate is 3-methyl-4,4'-diisocyanatodiphenylmethane, 9 percent is 3-methyl-2,4'-diisocyanatodiphenylmethane, and the remainder of said diisocyanate is a mixture of the 4,4'-- and 2,4'-isomers of methylenebis(phenylisocyanate).

EXAMPLE 6

Using the procedure described in Example 5 but replacing o-toluidine by by 2,4-diaminotoluene there is obtained a mixture of polyphenyl polyamines containing, as the major component, a mixture of 3-methyl-4,4',6-triaminodiphenylmethane and 3-methyl-2,4,4'-triaminodiphenylmethane.

The mixture of polyamines so obtained is then phosgenated, using the procedure described in the last part of Example 5, to yield the corresponding mixture of polymethylene polyphenyl polyisocyanates.

We claim:

1. A process for the preparation of a mixture of methylene-bridged polyphenyl polyamines wherein the major component is di(aminophenyl)methane wherein the proportion of o,p'-isomer to p,p'-isomer in the latter is within the range of 20:80 to 30:70, said process comprising:

heating in the absence of acid at a temperature within the range of about 150°C to about 300°C a mixture of (i) an aromatic primary amine and (ii) an acid-free mixture of aminobenzylamines obtained by condensing aniline with formaldehyde in the presence of mineral acid and neutralizing the reaction product.

2. The process of claim 1 wherein the starting aminobenzylamines have been prepared by the acid condensation of aniline and formaldehyde in the molar proportion of aniline to formaldehyde of at least 2:1 and at a temperature less than about 50°C.

3. The process of claim 1 wherein the aromatic primary amine is aniline.

4. The process of claim 3 wherein the aniline is introduced into the reaction mixture by employing an excess over the stoichiometric quantity of aniline in the condensation with formaldehyde to produce the intermediate aminobenzylamines.

5. The process of claim 1 wherein the molar proportion of mineral acid to aniline employed in the preparation of the aminobenzylamines is within the range of 0.01:1 to 0.85:1.

6. A process for the preparation of a mixture of methylene-bridged polyphenyl polyamines wherein the major coponent is di(aminophenyl)methane and wherein the proportion of o,p'-isomer to p,p'-isomer in the latter is within the range of 20:80 to 30:70, said process comprising:

a. reacting a mixture of aniline and formaldehyde in the presence of aqueous mineral acid at a temperature of about 0°C to about 50°c, the amount of aniline employed being in excess of 2 moles per mole of formaldehyde;
b. neutralizing the reaction mixture so obtained; and
c. heating the acid free reaction mixture to a temperature of about 150°C to about 300°C to obtain the desired mixture of methylene-bridged polyphenyl polyamines.

7. The process of claim 6 wherein the proportion of mineral acid to aniline in the initial reaction mixture is within the range of about 0.01:1 to about 0.85:1.

8. The process of claim 6 wherein additional aniline is added to the acid free intermediate reaction mixture prior to the final heating step.

9. A process for the preparation of a mixture of methylene-bridged polyphenyl polyamines said process comprising:

a. reacting a mixture of aniline and formaldehyde in the presence of aqueous mineral acid at a temperature of about 0°C to about 50°C, the amount of aniline employed being in excess of 2 moles per mole of formaldehyde;
b. neutralizing the reaction mixture so obtained;
c. removing the excess aniline from said reaction mixture; and
d. heating said acid- and aniline-free reaction mixture with an aromatic primary amine other than aniline to a temperature of about 150°c to about 300°C to obtain the desired mixture of methylene-bridged polyphenyl polyamines.

10. The process of claim 9 wherein aromatic amine other than aniline is o-toluidine.

11. The process of claim 9 wherein said aromatic amine other than aniline is 2,4-diaminotoluene.

* * * * *

UNITED STATES PATENT OFFICE
CERTIFICATE OF CORRECTION

Patent No. 3,857,890        Dated December 31, 1974

Inventor(s) Francesco P. Recchia and Henri Ulrich

It is certified that error appears in the above-identified patent and that said Letters Patent are hereby corrected as shown below:

Column 2, line 35:

the latter substantial

Should read:

the latter is substantial

Column 3, lines 14-18:

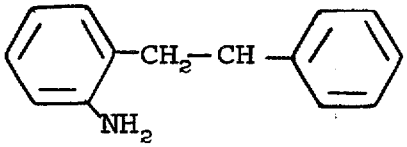

(IV)

Should read:

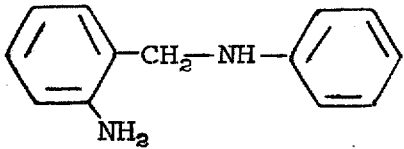

(IV)

Column 5, line 37:

are ment

Should read:

are meant

Column 12, line 19:

and, G.L.P.C.,

Should read:

and, by G.L.P.C.,

Column 12, line 29:

maintained to 0° to 2°C.

Should read:

maintained at 0 to 2°C.

Column 13, line 21:

was heated under pressure

Should read:

was heated under reduced pressure

-1- (continued)

UNITED STATES PATENT OFFICE
CERTIFICATE OF CORRECTION

Patent No. 3,857,890  Dated December 31, 1974

Inventor(s) Francesco P. Recchia and Henri Ulrich

It is certified that error appears in the above-identified patent and that said Letters Patent are hereby corrected as shown below:

Column 14, Claim 6, Line 66:    Should read:

major coponent                   major component

Column 16, Claim 10, Line 14:   Should read:

wherein aromatic amine           wherein said aromatic amine

Signed and sealed this 18th day of March 1975.

(SEAL)
Attest:

RUTH C. MASON
Attesting Officer

C. MARSHALL DANN
Commissioner of Patents
and Trademarks